United States Patent
Blanco et al.

(10) Patent No.: US 9,424,814 B2
(45) Date of Patent: *Aug. 23, 2016

(54) BUFFER DISPLAY TECHNIQUES

(71) Applicant: Microsoft Technology Licensing, LLC, Redmond, WA (US)

(72) Inventors: Leonardo E. Blanco, Redmond, WA (US); Daniel N. Wood, Seattle, WA (US); Max McMullen, Redmond, WA (US); Allison W. Klein, Seattle, WA (US); Brian T. Klamik, Redmond, WA (US); Michael I. Borysenko, Redmond, WA (US); Keith D. Melmon, Redmond, WA (US); Michael P. Crider, Redmond, WA (US); Silvana Patricia Moncayo, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,250

(22) Filed: Jul. 21, 2015

(65) Prior Publication Data

US 2015/0325218 A1    Nov. 12, 2015

Related U.S. Application Data

(63) Continuation of application No. 14/515,444, filed on Oct. 15, 2014, now Pat. No. 9,111,370, which is a continuation of application No. 13/229,474, filed on Sep. 9, 2011, now Pat. No. 8,884,978.

(51) Int. Cl.
    *G09G 5/36*   (2006.01)
    *G09G 5/395*  (2006.01)
    *G06T 1/60*   (2006.01)

(52) U.S. Cl.
    CPC .............. *G09G 5/395* (2013.01); *G06T 1/60* (2013.01); *G09G 2360/18* (2013.01)

(58) Field of Classification Search
    None
    See application file for complete search history.

(56) References Cited

U.S. PATENT DOCUMENTS

| | | | |
|---|---|---|---|
| 5,381,347 A * | 1/1995 | Gery | G09G 5/399 |
| | | | 345/502 |
| 5,844,569 A | 12/1998 | Eisler et al. | |
| 6,734,873 B1 | 5/2004 | Herf et al. | |
| 6,911,984 B2 | 6/2005 | Sabella et al. | |
| 8,884,978 B2 | 11/2014 | Blanco et al. | |
| 2006/0033745 A1 | 2/2006 | Koselj et al. | |
| 2007/0064017 A1 | 3/2007 | Inamoto et al. | |
| 2009/0184972 A1 | 7/2009 | Weybrew et al. | |

(Continued)

OTHER PUBLICATIONS

"Core Video Concepts", Retrieved from: <http://developer.apple.com/library/mac/#documentation/GraphicsImaging/Conceptual/CoreVideo/CVProg_Concepts/CVProg_Concepts.html> on Jul. 13, 2011, Apr. 3, 2007, 4 pages.

(Continued)

*Primary Examiner* — Jacinta M Crawford
(74) *Attorney, Agent, or Firm* — Timothy Churna; Judy Yee; Micky Minhas

(57) ABSTRACT

Buffer display techniques are described. In one or more implementations, at least part of an off-screen buffer is rasterized by an application to generate an item for display by the computing device. One or more communications are formed that describe the part of the off-screen buffer which contains the item that is to be copied to update an onscreen buffer.

20 Claims, 7 Drawing Sheets

(56) References Cited

U.S. PATENT DOCUMENTS

2013/0063456 A1 3/2013 Blanco
2015/0035844 A1 2/2015 Blanco et al.

OTHER PUBLICATIONS

"dbe(3)—Linux Man Page", Retrieved from: <http://linux.die.net/man/3/dbe> on Jul. 13, 2011, 3 pages.
"glAddSwapHintRectWIN", Retrieved from: <http://msdn.microsoft.com/en-us/library/ms537013.aspx> on Jul. 13, 2011, 2 pages.
"Non-Final Office Action", U.S. Appl. No. 13/229,474, Mar. 27, 2014, 11 pages.
"Non-Final Office Action", U.S. Appl. No. 14/515,444, Nov. 7, 2014, 18 pages.
"Notice of Allowance", U.S. Appl. No. 13/229,474, Jul. 8, 2014, 4 pages.
"Notice of Allowance", U.S. Appl. No. 14/515,444, Apr. 14, 2015, 7 pages.
"QuickDraw 3D RAVE API Support", Retrieved from : <http://developer.amd.com/archive/gpusamples/3DRave/Pages/default.aspx> on Jul. 13, 2011, 8 pages.
"The Frame Buffer", Retrieved from: <http://www.yaldex.com/open-gl/ch01lev1sec4.html> on Jul. 13, 2011, 3 pages.
Vernon,"Dynamic Buffers", Retrieved from: <http://www.chadvernon.com/blog/resources/directx9/dynamic-buffers/> on Jul. 13, 2011, 8 pages.

\* cited by examiner

BUFFER DISPLAY TECHNIQUES

PRIORITY APPLICATION

This application claims benefit of priority of U.S. patent application Ser. No. 14/515,444 entitled "Buffer Display Techniques" filed Oct. 15, 2014 that claims priority of U.S. patent application Ser. No. 13/229,474 entitled "Buffer Display Techniques" filed Sep. 9, 2011, the content of both of which is incorporated by reference herein in its entirety.

BACKGROUND

The variety of computing device configurations continues to increase. From traditional desktop personal computers to mobile phones, game consoles, set-top boxes, tablet computers, and so on, the functionality available from each of these configurations may vary greatly. Consequently, traditional display techniques that were developed for one configuration may not be as well suited for another configuration. For example, display techniques that were previously utilized for devices having significant memory resources may be ill-suited for devices having fewer resources.

SUMMARY

Buffer display techniques are described. In one or more implementations, at least part of an off-screen buffer is rasterized by an application to generate an item for display by the computing device. One or more communications are formed that describe the part of the off-screen buffer which contains the item that is to be copied to update an onscreen buffer.

In one or more implementations, one or more communications are received that describe a part of an off-screen buffer maintained in memory of a computing device which contains an item rasterized in the off-screen buffer by an application that is executed by the computing device. The part of the off-screen buffer described in the one or more communications is copied to an onscreen buffer. The onscreen buffer is caused to be used to display data contained therein on a display device of the computing device.

In one or more implementations, a computing device includes a display device, memory configured to maintain off-screen and onscreen buffers containing bitmaps for display by the display device, the off-screen buffer having a size that is less than a size of the onscreen buffer, and one or more modules implemented at least partially in hardware. The one or more modules are configured to update the onscreen buffer using at least a portion of the off-screen buffer to cause display of the portion of the off-screen buffer with at least a portion of the onscreen buffer simultaneously on the display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Display techniques are described herein which leverage buffers. In one or more implementations, a buffer display technique is utilized that is based on an object called a swap chain, which is an array of buffers representing a bitmap generally having a matching size. One of the buffers is used to present data on a display device at any one time and therefore may be called the "onscreen buffer" or "front buffer." The other buffers are made available to an application for rasterization off screen and therefore are referred to as an "off-screen buffer" or "back buffer."

An application may make a change to what is displayed on the screen in a variety of ways. In a first such technique, the application can redraw one of the back buffers and "flip" the contents, such as by making one of the off-screen buffers the onscreen buffer using a pointer and vice versa. The additional buffers, however, cost additional video memory. In the case where the contents on screen change infrequently, that extra memory may be wasted.

Accordingly, in a second such technique buffers of different sizes may also be leveraged. For example, the buffer display techniques may leverage a first buffer as an onscreen buffer. The buffer display techniques may also leverage a second buffer that is smaller than the first buffer as an off-screen buffer. Therefore, when an update is to be made to the content, the update may be rasterized to the second buffer. The update may then be copied to the onscreen buffer. In this way, resources of a computing device may be conserved.

In the following discussion, an example environment is first described that is operable to perform the buffer display techniques described herein. Examples procedures are then described, which are operable in the example environment as well as in other environments. Likewise, the example environment is not limited to performance of the example procedures.

Example Environment

Figure 1:
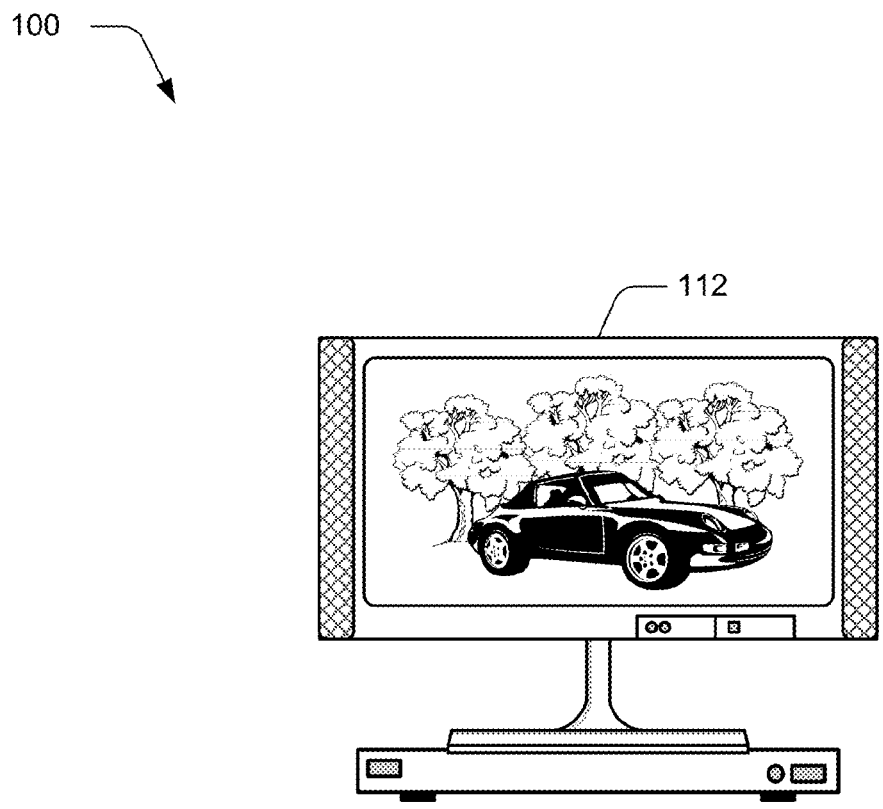
FIG. 1 is an illustration of an environment in an example implementation that is operable to perform buffer display techniques described herein.
Figure 1:
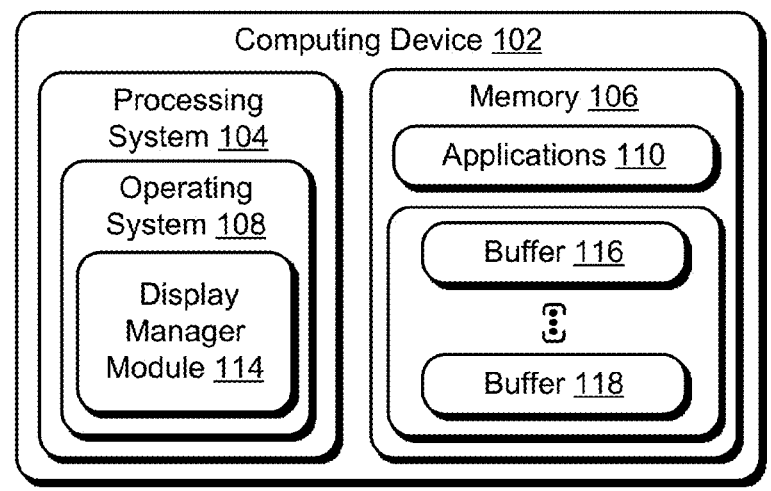

FIG. 1 illustrates an operating environment in accordance with one or more embodiments, generally at 100. Environment 100 includes a computing device 102 having a processing system 104 that may include one or more processors, an example of computer-readable storage media illustrated as memory 106, an operating system 108, and one or more applications 108. Computing device 102 can be embodied as any suitable computing device such as, by way of example and not limitation, a desktop computer, a portable computer, a handheld computer such as a personal digital assistant (PDA), mobile phone, tablet computer, and the like. Different examples of a computing device 102 is shown and described below in FIGS. 6 and 7.

The computing device 102 also includes an operating system 108 that is illustrated as being executed on the processing system 104 and is storable in memory 106. The computing device 102 further includes applications 110 that are illustrated as being stored in the memory 106 and are also executable on the processing system 104. The operating system 108 is representative of functionality of the computing device 102 that may abstract underlying hardware and software resources for use by the applications 110. For example, the operating system 108 may abstract functionality of how data is displayed on the display device 112 without the applications 110 having to "know" how this display is achieved. A variety of other examples are also contemplated, such as to abstract the processing system 104 and memory 106 resources of the computing device 102, network resources, and so on.

The computing device 102 is also illustrated as including a display manager module 114. Although illustrated as part of the operating system 108, the display manager module 114 may be implemented in a variety of ways, such as a stand-alone module, as a separate application, as part of hardware of the computing device 102, and so on.

The display manager module 114 is representative of techniques that may be used to display data from applications 110 on the display device 112. For example, the display manager module 114 may leverage a pool of buffers, two examples of which are illustrated as buffer 116 and buffer 118 but it should be readily apparent that a larger number of buffers are also contemplated.

The display manager module 114 may support a variety of different techniques that leverage the buffers 116, 118 for use in display of data on the display device 112. On such technique may expose the buffer 116 for rasterization by the applications 110 to generate an initial view of the display device, e.g., via one or more application programming interfaces (APIs). For example, the application 110 may specify a desired size of the buffer 116 and generate a bitmap for display. A pointer may then be provided by the application 110 to the display manager module 114 to indicate that the bitmap in the buffer 116 is ready for display. Thus, this buffer 116 may be set for use by the display manager module 114 as the "onscreen" buffer.

Another such technique may be supported to allow the application 110 to provide updates to "what is being displayed" from the onscreen buffer. For example, the application 110 may also specify another buffer 118 as an off-screen buffer. The application 110 may then write updates to this buffer 118, e.g., rasterize data at a bitmap for display.

When ready, the application 110 may then communicate with the display manager module 114 to provide a location where the update is available, a size of the update, a source that is to receive the update, and a location in the source at which the update is to be copied. The update may then be copied from buffer 118 (i.e., the off-screen buffer) to the buffer 116 (i.e., the onscreen buffer) to cause display of the update. Thus, the buffer 118 configured as the off-screen buffer may be made smaller (e.g., consume less memory 106 resources) than the buffer 116 configured as the onscreen buffer, provide increased update efficiency by decreasing an amount of data that is drawn to the buffer, and so on, further discussion of which may be found in relation to the following figures.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the buffer display techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
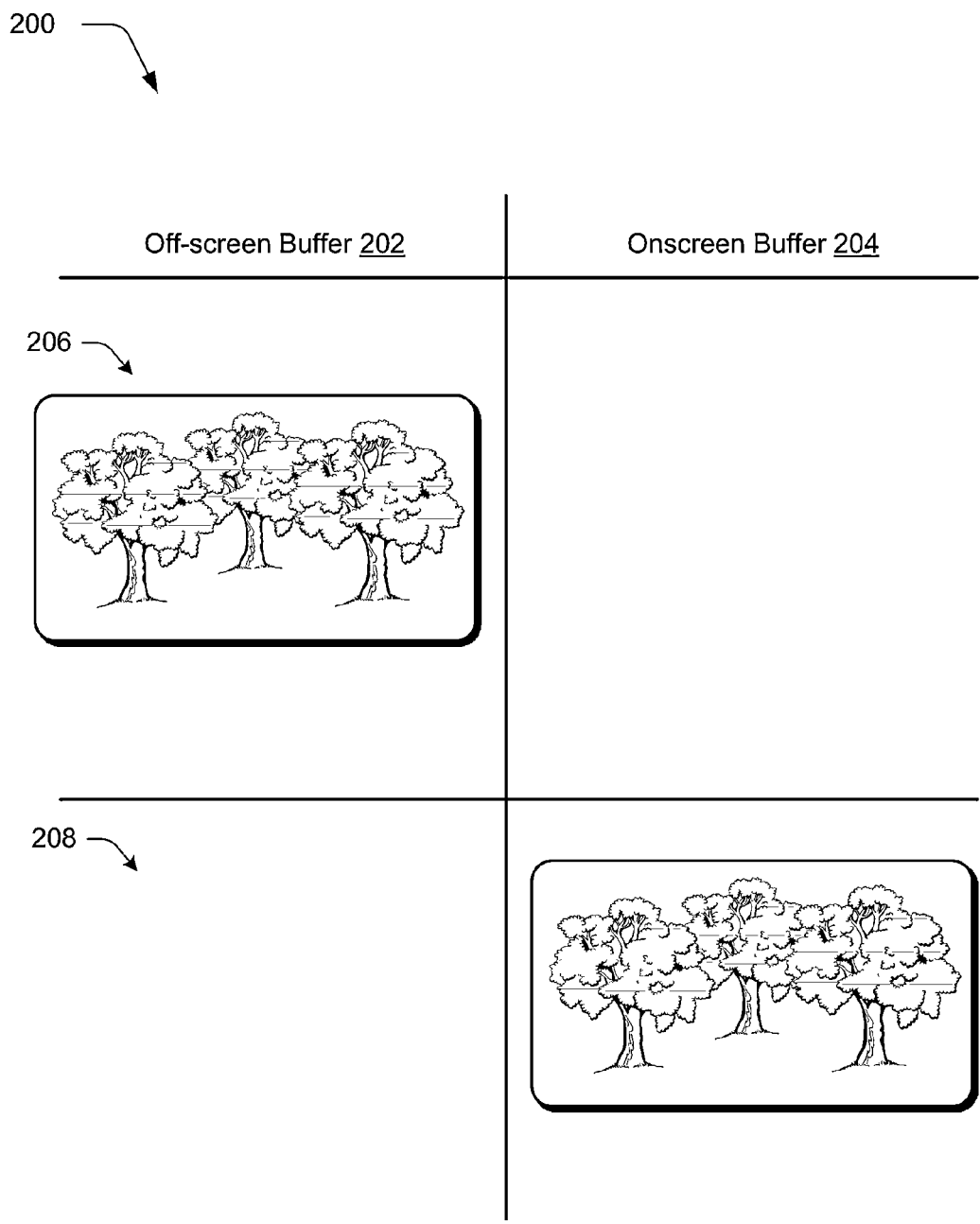
FIG. 2 is an illustration of a system in an example implementation showing usage of off-screen and onscreen buffers.

FIG. 2 is an illustration of a system 200 in an example implementation showing usage of off-screen and onscreen buffers. Conventional display techniques that relied on flip-chain presentation models, alone, may not scale well due to extensive use of resource intensive techniques that involve surface creation and consume a relatively significant amount of memory. Accordingly, the buffer display techniques described herein may be used to reduce the amount of surface creation and memory involved in rendering visuals.

In the following discussion, a visual may refer to a basic composition element. For example, a visual may contain a bitmap and associated compositional metadata for processing by the display manager module 114. An atlas may refer to an aggregate layer which may include a plurality of layers to be rendered, although a single layer is also contemplated.

A swap chain refers to a series of buffers that may "flip" to the screen on after another, such as by changing pointers. Accordingly, a flip mode is a mode by which a swap chain technique is used to make an off-screen buffer an onscreen buffer, e.g., through the use of swapping points between the off-screen and onscreen buffers. However, a blit mode refers to a technique in which a runtime of the display manager module 114 issues a "blit" (e.g., bit block image transfer) from an off-screen buffer to an onscreen buffer 204. An example implementation using these terms is now discussed.

An example of use of a flip-chain technique may be found in relation to the example system 200 of FIG. 2. The system 200 includes logical off-screen and onscreen buffers 202, 204. Use of the off-screen buffer 202 and onscreen buffer 202, 204 is further illustrated through use of first and second stages 206, 208, which may refer to different points in time.

At the first stage 206, an application 110 has rasterized a bitmap to an off-screen buffer 202. The off-screen buffer 202 may thus function as a generic surface for which content can be drawn and read from. The definition of whether a buffer is an off-screen or onscreen buffer 202, 2024 may be based on "ownership" of the buffer, e.g., which entity has access to the buffer. When the application 110 has write access to a buffer, the buffer is defined as an "off-screen buffer." When the display manager module 114 has access, the module "owns" the buffer for display of the bitmap from the buffer and thus may be referred to as the onscreen buffer 204. The display manager module 114, for instance, may expose an API that allows the application 110 to "hand" an off-screen buffer 202 to the display manager module to use as an onscreen buffer as shown in the second stage 208.

Thus, upon initialization an application 110 may render directly to the onscreen buffer 204 without rendering to the off-screen buffer 202 first to reduce the initial first-frame cost. This may be done by rendering to the off-screen buffer 202 and then passing control of the buffer to the display manager module 114, thereby making this buffer the onscreen buffer. Subsequent updates may then be made through the off-screen 202 buffer as further described in relation to the following figure.

Figure 3:
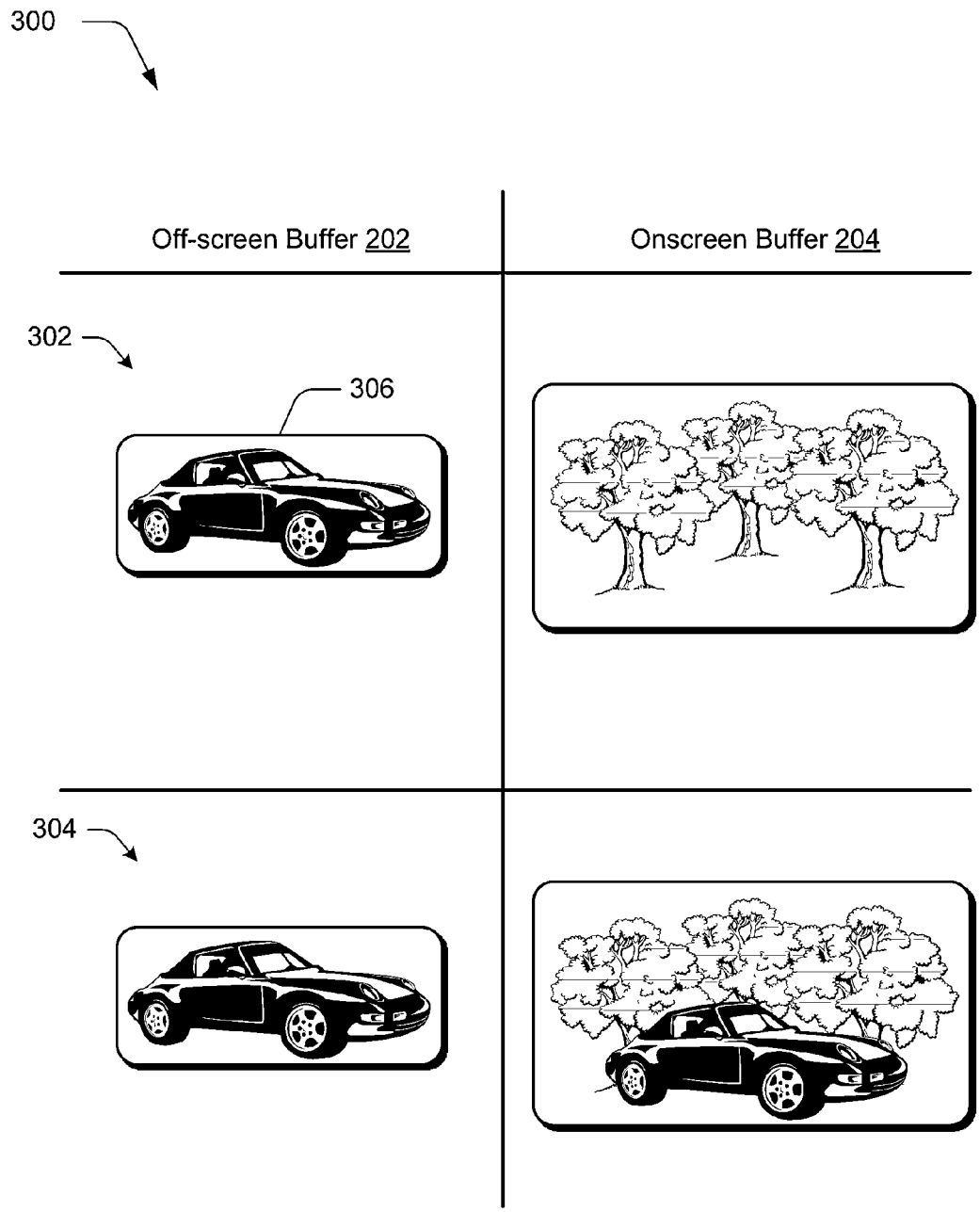
FIG. 3 depicts a system in an example implement showing processing of an update to an onscreen buffer of FIG. 2.

FIG. 3 depicts a system 300 in an example implement showing processing of an update to the onscreen buffer 204 of FIG. 2. As before, the system 300 of FIG. 3 is illustrated using first and second stages 302, 304. This system 300 is a continuation of the usage pattern of FIG. 2 in which an initial buffer was created, an application rendered data into the buffer, and the buffer was handed to the display manager module 114 for use as an onscreen buffer, e.g., a front atlas. At that point, the application 110 no longer has direct access to the buffer as previously described, although other examples including continued access are also contemplated.

At the first stage 302 of FIG. 3, an application 110 creates a visual 306 (e.g., a visual tree) in the off-screen buffer 202. The application 110 also associates the visual with a bitmap in the onscreen buffer 204, e.g., a location at which the visual 306 is to be rendered.

At the second stage 304, the application 110 may then "hand" the update to the display manager module 114 for rendering. For example, the application 110 may communicate an identification of the off-screen buffer 202, a size and/or location of the update in the off-screen buffer 202, an identification of the onscreen buffer 204, and a location in the onscreen buffer 204 at which the update is to be rendered. The display manager module 114 may then update the onscreen buffer 204 by copying the update to the onscreen buffer 204, e.g., using a blit operation.

Thus, the techniques described herein may reduce surface creation time and video memory cost associated with creating a swap chain for each visual. As described above, the display manager module may enable the application 110 to create an off-screen buffer 202 (e.g., a back atlas which may refer to an off-screen buffer that is an atlas) which may be used to contain multiple visuals into one surface. The application 110 may then leverage this off-screen buffer 202 to create updates formed as bitmaps without creating a swap chain for each new visual. When the content is ready to be composed, the content of the off-screen buffer 202 may be copied to the onscreen buffer 204 for consumption by the display manager module 114 using a blit operation. After the copying is complete (e.g., the blit operation is finished), the application 110 may continue to use the off-screen buffer 202 for further updates.

Figure 4:
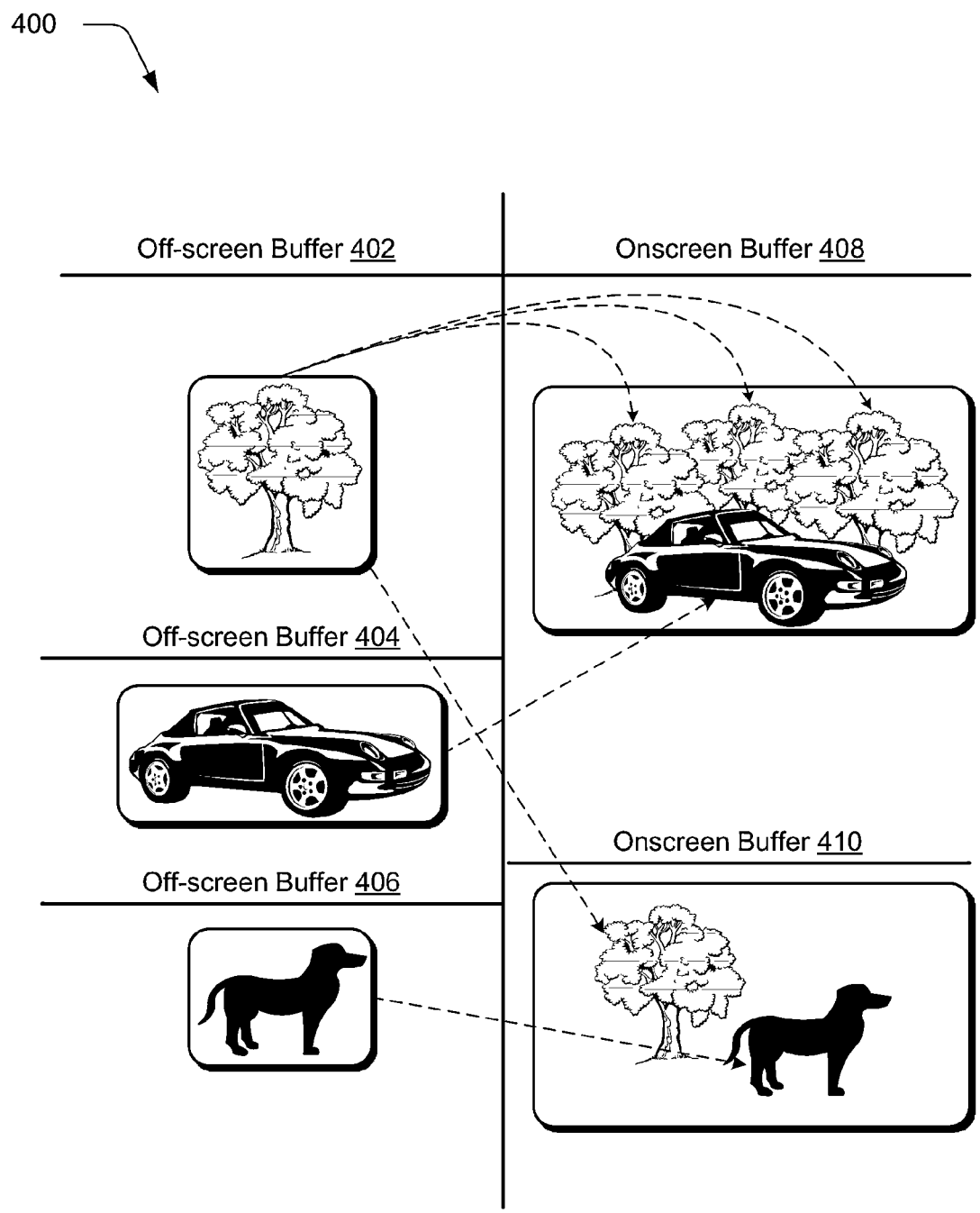
FIG. 4 depicts a system in an example implementation in which the off-screen and onscreen buffers are utilized to support scatter-gather techniques.

FIG. 4 depicts a system 400 in an example implementation in which the off-screen and onscreen buffers are utilized to support scatter-gather techniques. Scatter-gather refers to the ability for an application to create and make updates to any number of of-screen and onscreen buffers 202, 2024 within the confines of hardware support. The application 110, for instance, may have an option to update any region of any off-screen buffer 202 "owned" by the application 110 and have the contents of the buffer copied to whichever onscreen buffer is desired.

An example of this is illustrated in the example system 400 of FIG. 4 that includes a plurality of off-screen buffers 402, 404, 406 and a plurality of onscreen buffers 408, 410. In this example, a visual of a tree in the off-screen buffer 402 is leverage for both onscreen buffers 408, 410. A visual of a car in the off-screen buffer 404 is utilized for onscreen buffer 408 and a visual of a dog in the off-screen buffer 406 is utilized to update the onscreen buffer 410. In the way, an application 110 may cause a visual to be copied by the digital display module 114 to whichever destination it chooses.

The application 110 also has the freedom to decide how large of a surface area is to be allocated for each of the buffers. This technique affords the applications 110 the agility to design a configuration that optimizes a scenario's performance characteristics.

In terms of video memory consumption, depending on the efficiency of the packing algorithm and how the off-screen and onscreen buffers are set up, an application 110 can consume less than 2× the area of the visuals as was previously involved using a swap chain alone. Moreover, an application can avoid the padding cost some drivers apply when dealing with small textures to reach the minimum supported size.

In one or more implementations, the display manager module 114 "owns" execution of the blit operation. Further, the application 110 may be blocked from access to the off-screen buffer during performance of the operation. This way, the display manager module 114 may synchronize updates to the onscreen buffer, e.g., with when it wakes up on video blanking intervals. This may be utilized to avoid tearing that may take place due to an application updating the content of the off-screen buffer before the display manager module 114 has had the chance to draw the previously committed changes. It should be readily apparent, though, that other implementations are also contemplated in which ownership of the operation is given to another entity of the computing device 102.

As described above, the display manager module 114 may expose functionality to allow an application 110 to create a pool of buffers 116, 118 (e.g., texture buffers) of different sizes. Further, the display manager module 114 may permit the application 110 to associate one or more buffers with one or more visual to be rendered, thereby allowing the display manager module 114 to determine where and how to present data from the buffers on the display device 112.

The application 110 may also associate portions (e.g., sub-rectangles) of a buffer 118 with one or more visuals.

This allows the application to use a single buffer to logically contain several images. This kind of image organization may be referred to as an "atlas." In one or more implementations, the buffers 116, 118 in the pool which are associated with visuals are not directly accessible by the application 108, but rather indirectly via a method of the display manager module 114 that instructs the module to copy a set of rectangles from a set of off-screen buffers to a set of on-screen buffers. The buffers which are not associated with visuals are accessible to the application for rasterization.

Therefore, when the application wants to update one or more on-screen buffers, the application produces a rasterization for each of the regions to be updated. The application 110 may then build a mapping of updated regions to updated sections of the onscreen buffers.

The following is a sample usage pattern of a call by an application to one or more APIs of the display manager module 114. First, the application 110 may render one or more visuals to an off-screen buffer, e.g., a back atlas. Once the drawing is completed, the application 110 may call one or more APIs of the display manager module 114. The display manager module 114 may "wake up" (e.g., at a video blanking interval) and assume temporary ownership of the off-screen buffer, thereby preventing the application 110 from making further updates to the buffer.

The display manager module 114 may then use pixel data from the API call (i.e. description of a source and a location of a destination in the onscreen buffer) to blit one or more visuals to the onscreen buffer, e.g., a front atlas buffer. Once the blit operation completes, the application 110 regains write access to the off-screen buffer at which point further updates can begin. Thus, the swap chain techniques may be utilized in a variety of ways, such as for video, a progress/seek bar, and so on. The blit mode techniques may be used for video titles, controls, and so on. Thus, the application 110 may choose which of these techniques to use, thereby promoting efficient use of the computing device 102.

Example Procedures

The following discussion describes buffer display techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-400 of FIGS. 2-4.

Figure 5:
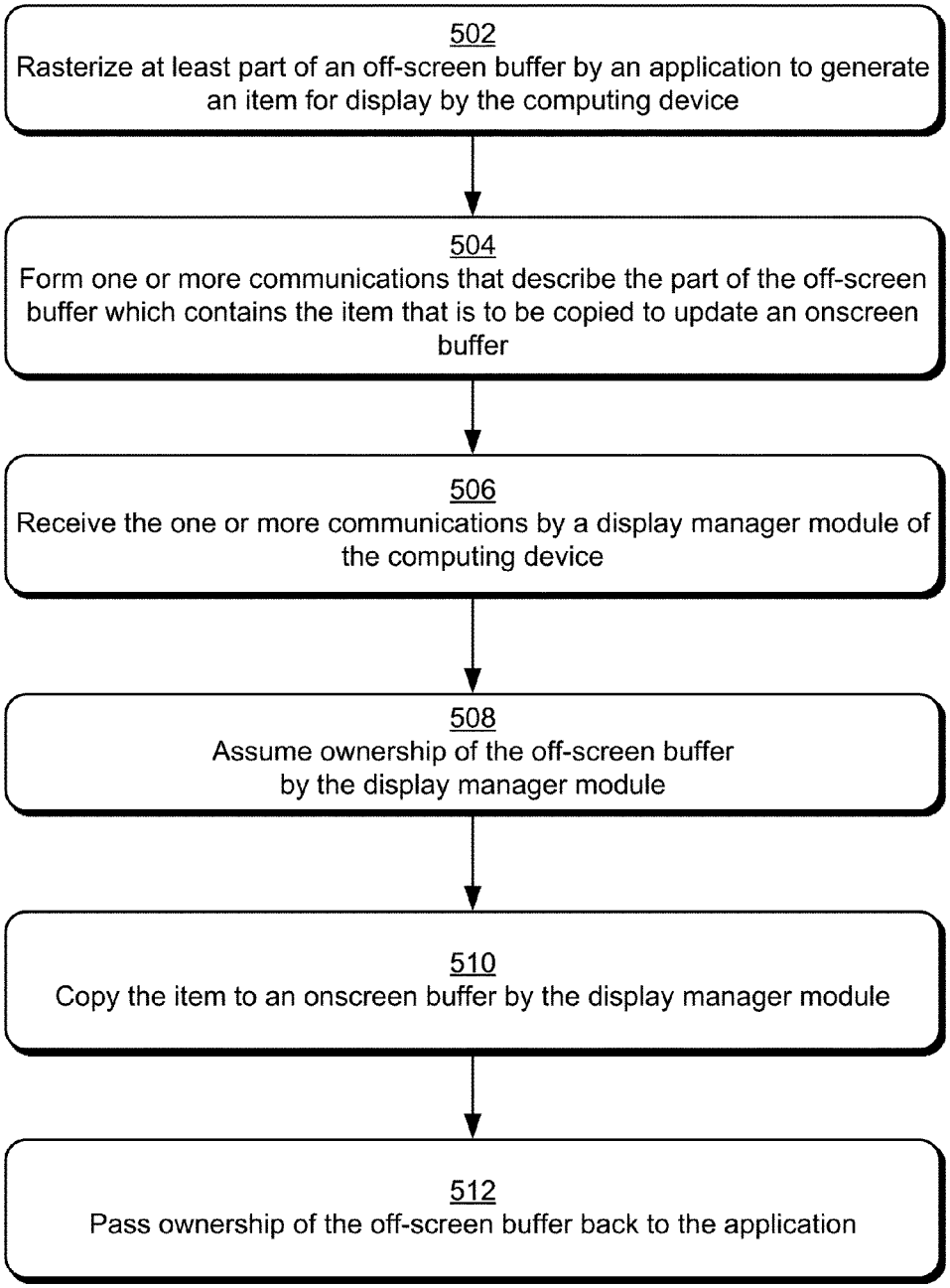
FIG. 5 is a flow diagram depicting a procedure in an example implementation in which a buffer is utilized to update another buffer.

FIG. 5 depicts a procedure 500 in an example implementation in which a buffer is utilized to update another buffer. At least part of an off-screen buffer is rasterized by an application to generate an item for display by a computing device (block 502). The item, for example, may be a visual for output in a user interface.

One or more communications are formed that describe the part of the off-screen buffer which contains the item that is to be copied to update an onscreen buffer (block 504). The communications, for example, may be configured as one or more API calls to the display manager module 114. The communications may identify the off-screen buffer, describe a size of the item, a location of the item in the off-screen buffer, a destination buffer that is to receive the item, and an offset at which the item is to be copied to the buffer.

The one or more communications are received by the display manager module of the computing device (block 506). Ownership of the off-screen buffer is assumed by the display manager module (block 508), such as to block access by the application to the buffer. The item is copied to an onscreen buffer by the display manager module (block 510), such as by using a blit operation. Upon completion, the ownership of the off-screen buffer is passed back to the application (block 512).

Example System and Device

Figure 6:
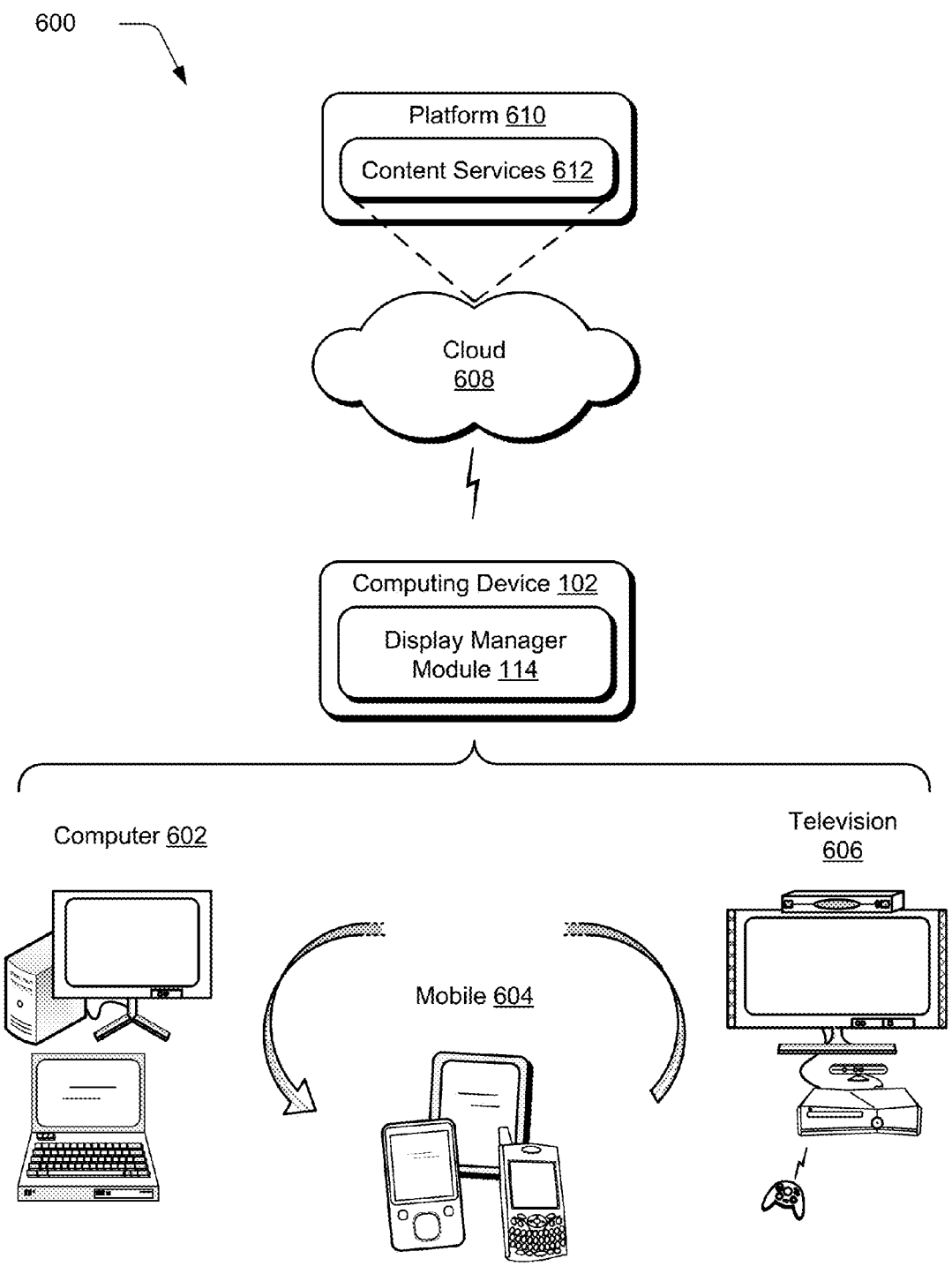
FIG. 6 illustrates an example system that includes the computing device as described with reference to FIG. 1.

FIG. 6 illustrates an example system 600 that includes the computing device 102 as described with reference to FIG. 1. The example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 602, mobile 604, and television 606 uses. Each of these configurations includes devices that may have generally different constructs and capabilities, and thus the computing device 102 may be configured according to one or more of the different device classes. For instance, the computing device 102 may be implemented as the computer 602 class of a device that includes a personal computer, desktop computer, a multi-screen computer, laptop computer, netbook, and so on.

The computing device 102 may also be implemented as the mobile 604 class of device that includes mobile devices, such as a mobile phone, portable music player, portable gaming device, a tablet computer, a multi-screen computer, and so on. The computing device 102 may also be implemented as the television 606 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein, which is illustrated through inclusion of the display management module 114.

The cloud 608 includes and/or is representative of a platform 610 for content services 612. The platform 610 abstracts underlying functionality of hardware (e.g., servers) and software resources of the cloud 608. The content services 612 may include applications and/or data that can be utilized while computer processing is executed on servers that are remote from the computing device 102. Content services 612 can be provided as a service over the Internet and/or through a subscriber network, such as a cellular or Wi-Fi network.

The platform 610 may abstract resources and functions to connect the computing device 102 with other computing devices. The platform 610 may also serve to abstract scaling of resources to provide a corresponding level of scale to encountered demand for the content services 612 that are implemented via the platform 610. Accordingly, in an interconnected device embodiment, implementation of functionality of the functionality described herein may be distributed throughout the system 600. For example, the functionality may be implemented in part on the computing device 102 as well as via the platform 610 that abstracts the functionality of the cloud 608.

Figure 7:
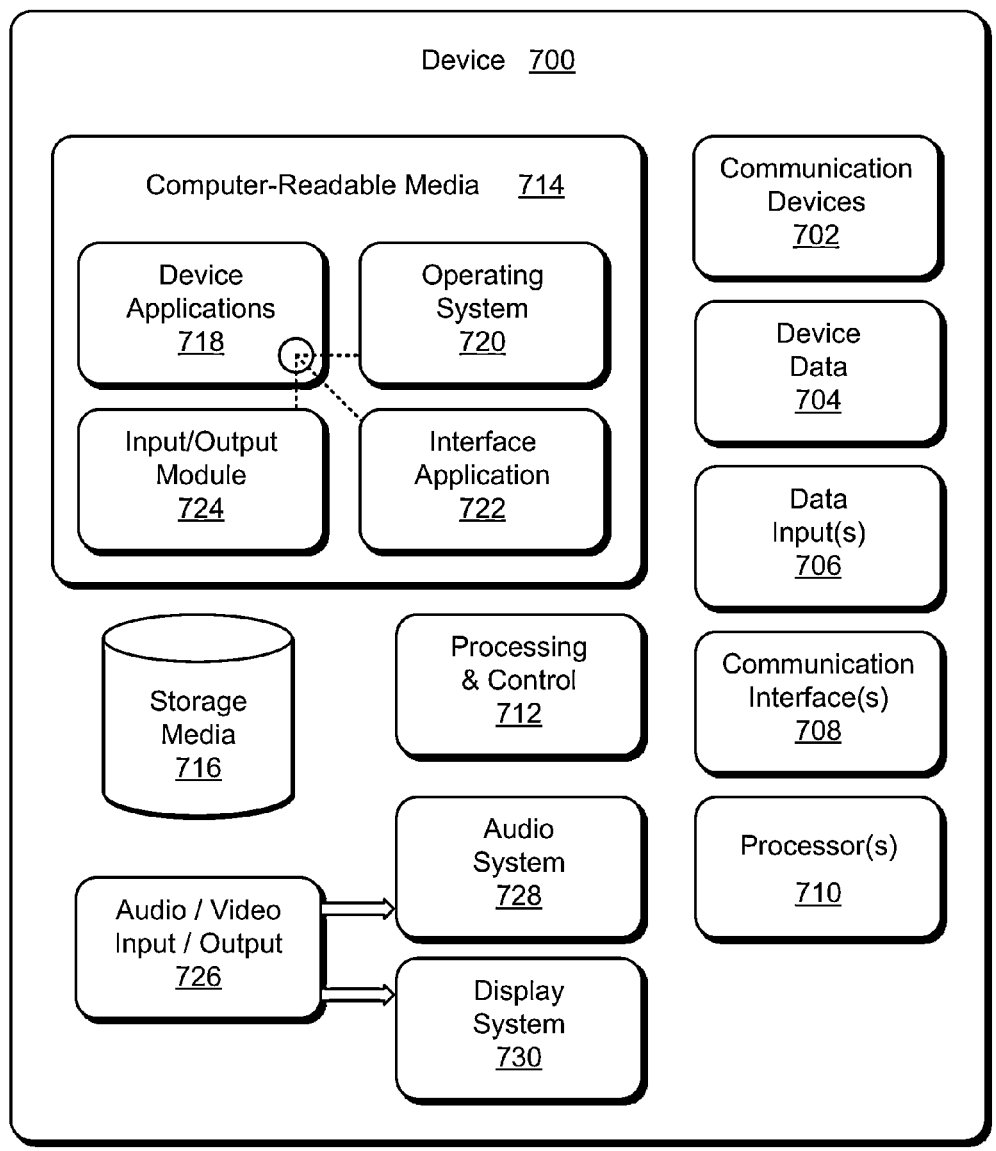
FIG. 7 illustrates various components of an example device that can be implemented as any type of computing device as described with reference to FIGS. 1, 2, and 6 to implement embodiments of the techniques described herein.

FIG. 7 illustrates various components of an example device 700 that can be implemented as any type of computing device as described with reference to FIGS. 1-4 and 6 to implement embodiments of the techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of the techniques described herein. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the techniques described herein. In this example, the device applications 718 include an interface application 722 and an input/output module 724 that are shown as software modules and/or computer applications. The input/output module 724 is representative of software that is used to provide an interface with a device configured to capture inputs, such as a touchscreen, track pad, camera, microphone, and so on. Alternatively or in addition, the interface application 722 and the input/output module 724 can be implemented as hardware, software, firmware, or any combination thereof. Additionally, the input/output module 724 may be configured to support multiple input devices, such as separate devices to capture visual and audio inputs, respectively.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising: creating an off-screen buffer by the computing device having a size specified by an application that is smaller than an onscreen buffer; rasterizing at least part of the off-screen buffer with an item for display by the computing device responsive to receiving the item from the application; and forming a communication by the computing device describing an update to be copied to the onscreen buffer, the update comprising the part of the off-screen buffer that contains the item.

2. A method as described in claim 1, wherein the update describes a display location at which the item is to be rendered.

3. A method as described in claim 1, wherein the onscreen buffer is one of a plurality of onscreen buffers and the update specifies which of the plurality of onscreen buffers to which the item is to be copied from the off-screen buffer.

4. A method as described in claim 1, wherein the onscreen buffer is controlled by an operating system of the computing device and is not directly accessible by the application.

5. A method as described in claim 1, wherein the communication includes a command indicating that the update is ready to be copied to the onscreen buffer.

6. A method as described in claim 5, wherein the command is initiated by the application for receipt by the computing device.

7. A method as described in claim 1, wherein the part of the off-screen buffer that contains the item is less than the size of the off-screen buffer.

8. A method as described in claim 1, wherein the off-screen and onscreen buffers are configured to include bitmaps that are to be output for display by the computing device.

9. A method as described in claim 1, further comprising copying the part of the off-screen buffer which contains the item described in the one or more communications to the onscreen buffer for display by the computing device.

10. A computing device comprising: a display device; memory configured to maintain off-screen and onscreen buffers containing bitmaps for display by the display device; and one or more modules implemented at least partially in hardware, the one or more modules executable on the computing device to update the onscreen buffer by copying at least a portion of the off-screen buffer to the onscreen buffer, the off-screen buffer not accessible during the update by an application that specified the update.

11. A computing device as described in claim 10, wherein the off-screen buffer is accessible by the application prior to the update to specify the update, the specification of the update comprising rasterizing an item for display in the portion of the off-screen buffer.

12. A computing device as described in claim 10, wherein the onscreen buffer is controlled by an operating system of the computing device and is not accessible by the application directly; and the one or more modules are part of the operating system as instructions that are executable by the hardware.

13. A computing device as described in claim 10, wherein a size of the off-screen buffer is specified by the application.

14. A computing device as described in claim 10, wherein the onscreen buffer is configured for use in conjunction with a plurality of off-screen buffers.

15. A computing device as described in claim 10, wherein the off-screen buffer is configured for use in conjunction with a plurality of onscreen buffers.

16. A method implemented by a computing device, the method comprising: creating an off-screen buffer by the computing device having a size smaller than an onscreen buffer that is usable by an application to generate items for display by the computing device; updating at least part of the off-screen buffer by the computing device with an item for display specified by the application; receiving a communication by the computing device to update the onscreen buffer with the part of the off-screen buffer that contains the item; copying the part of the off-screen buffer described in the communication by the computing device to the onscreen buffer; and causing the onscreen buffer to be used to display data contained therein by the computing device concurrently with a part of the onscreen buffer not updated by the communication.

17. A method as described in claim 16, wherein the creating and updating are performed through one or more application program interfaces of an operating system of the computing device accessible by the application.

18. A method as described in claim 16, wherein the communication references a display location within the onscreen buffer to which the part of the off-screen buffer is to be copied to and wherein the communication is received responsive to a command from the application that the update is complete.

19. A method as described in claim 16, wherein the onscreen buffer is one of a plurality of onscreen buffers and the communication further references which of the plurality of onscreen buffers to which the part of the off-screen buffer is to be copied.

20. A method as described in claim 16, wherein the off-screen buffer is a single off-screen buffer and the copying is not part of a swap chain of buffers.

* * * * *